(12) United States Patent
Hu (10) Patent No.: US 7,456,881 B2
(45) Date of Patent: Nov. 25, 2008

(54) METHOD AND APPARATUS FOR PRODUCING BAYER COLOR MOSAIC INTERPOLATION FOR IMAGERS

(75) Inventor: Shane C. Hu, Fremont, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 0 days.

(21) Appl. No.: 11/330,320

(22) Filed: Jan. 12, 2006

(65) Prior Publication Data

US 2007/0159544 A1    Jul. 12, 2007

(51) Int. Cl.
*H04N 5/335* (2006.01)

(52) U.S. Cl. .............. 348/273; 348/222.1; 348/280

(58) Field of Classification Search ............... 348/219, 348/242, 252, 266, 272, 273, 274, 275, 280, 348/282, 311, 373; 345/418, 586, 589, 608, 345/609
See application file for complete search history.

(56) References Cited

U.S. PATENT DOCUMENTS

| | | | |
|---|---|---|---|
| 3,971,065 A | 7/1976 | Bayer | |
| 6,366,318 B1* | 4/2002 | Smith et al. | 348/272 |
| 6,426,773 B1* | 7/2002 | Suzuki | 348/272 |
| 6,507,364 B1* | 1/2003 | Bishay et al. | 348/242 |
| 6,563,538 B1 | 5/2003 | Utagawa | |
| 6,642,932 B2* | 11/2003 | Kok et al. | 345/606 |
| 6,891,546 B1 | 5/2005 | Park et al. | |
| 6,894,810 B2 | 5/2005 | Walmsley | |
| 6,909,750 B2 | 6/2005 | Zhong et al. | |
| 6,911,955 B2 | 6/2005 | Ivanov et al. | |
| 6,917,381 B2* | 7/2005 | Acharya et al. | 348/252 |
| 6,944,263 B2 | 9/2005 | Xiao et al. | |
| 6,965,705 B1 | 11/2005 | Ma et al. | |
| 7,009,623 B2 | 3/2006 | Xarier | |
| 7,015,930 B2* | 3/2006 | Gruber | 345/606 |
| 7,019,521 B2 | 3/2006 | Orozco et al. | |
| 2004/0080639 A1* | 4/2004 | Ishiga | 348/272 |
| 2004/0114047 A1* | 6/2004 | Vora et al. | 348/340 |

FOREIGN PATENT DOCUMENTS

| | | |
|---|---|---|
| EP | 729278 A2 | 8/1996 |
| EP | 800317 A2 | 3/1997 |
| EP | 1079604 A2 | 2/2001 |
| JP | 2000-175208 * | 5/1999 |
| JP | 2000-175208 | 6/2000 |
| WO | WO 2004/006565 A2 | 1/2004 |

OTHER PUBLICATIONS

Bahadir K. Gunturk, Color Plane Interpolation Using Alternating Projections, IEEE Transactions on Image Processing, Sep. 2002, pp. 997-1013, vol. 11, No. 9, IEEE, USA.

* cited by examiner

*Primary Examiner*—Ngoc-Yen T. Vu
*Assistant Examiner*—Kent Wang
(74) *Attorney, Agent, or Firm*—Dickstein Shapiro LLP (57) ABSTRACT

A method and system for color plane interpolation in a color pattern which selects a color-interpolation point within a pixel image offset from the center of the pixel image for which the color plane interpolation is performed. Once the color-interpolation point is selected a value for each color in the color pattern at each color-interpolation point is interpolated.

12 Claims, 7 Drawing Sheets

METHOD AND APPARATUS FOR PRODUCING BAYER COLOR MOSAIC INTERPOLATION FOR IMAGERS

FIELD OF THE INVENTION

The present invention relates to color filters for use in solid-state image sensors.

BACKGROUND OF THE INVENTION

Image sensors, also known as imagers, were developed in the late 1960s and early 1970s primarily for television image acquisition, transmission, and display. An imager absorbs incident radiation of a particular wavelength (such as optical photons, x-rays, or the like) and generates an electrical signal corresponding to the absorbed radiation. There are a number of different types of semiconductor-based imagers, including charge coupled devices (CCDs), photodiode arrays, charge injection devices (CIDs), hybrid focal plan arrays, and CMOS imagers.

These imagers typically consist of an array of pixel cells containing photosensors, where each pixel produces a signal corresponding to the intensity of light impinging on that element when an image is focused on the array. These signals may then be stored, for example, to display a corresponding image on a monitor or otherwise used to provide information about the optical image. The photosensors are typically phototransistors, photoconductors or photodiodes. The magnitude of the signal produced by each pixel, therefore, is proportional to the amount of light impinging on the photosensor.

To allow the photosensors to capture a color image, the photosensors must be able to separately detect, for example when using a Bayer pattern, red (R) photons, green (G) photons and blue (B) photons. Accordingly, each pixel must be sensitive only to one color or spectral band. For this, a color filter array (CFA) is typically placed in front of the pixels so that each pixel measures the light of the color of its associated filter. Thus, each pixel of a color image sensor is covered with either a red, green or blue filter, according to a specific pattern.

For most low cost CMOS or CCD image sensors, the color filters are integrated with the sensor cells. A common example of a color filter pattern is the tiled color filter array illustrated in U.S. Pat. No. 3,971,065, (the disclosure of which is incorporated by reference herein) and commonly referred to as "the Bayer pattern" color filter.

Figure 1:
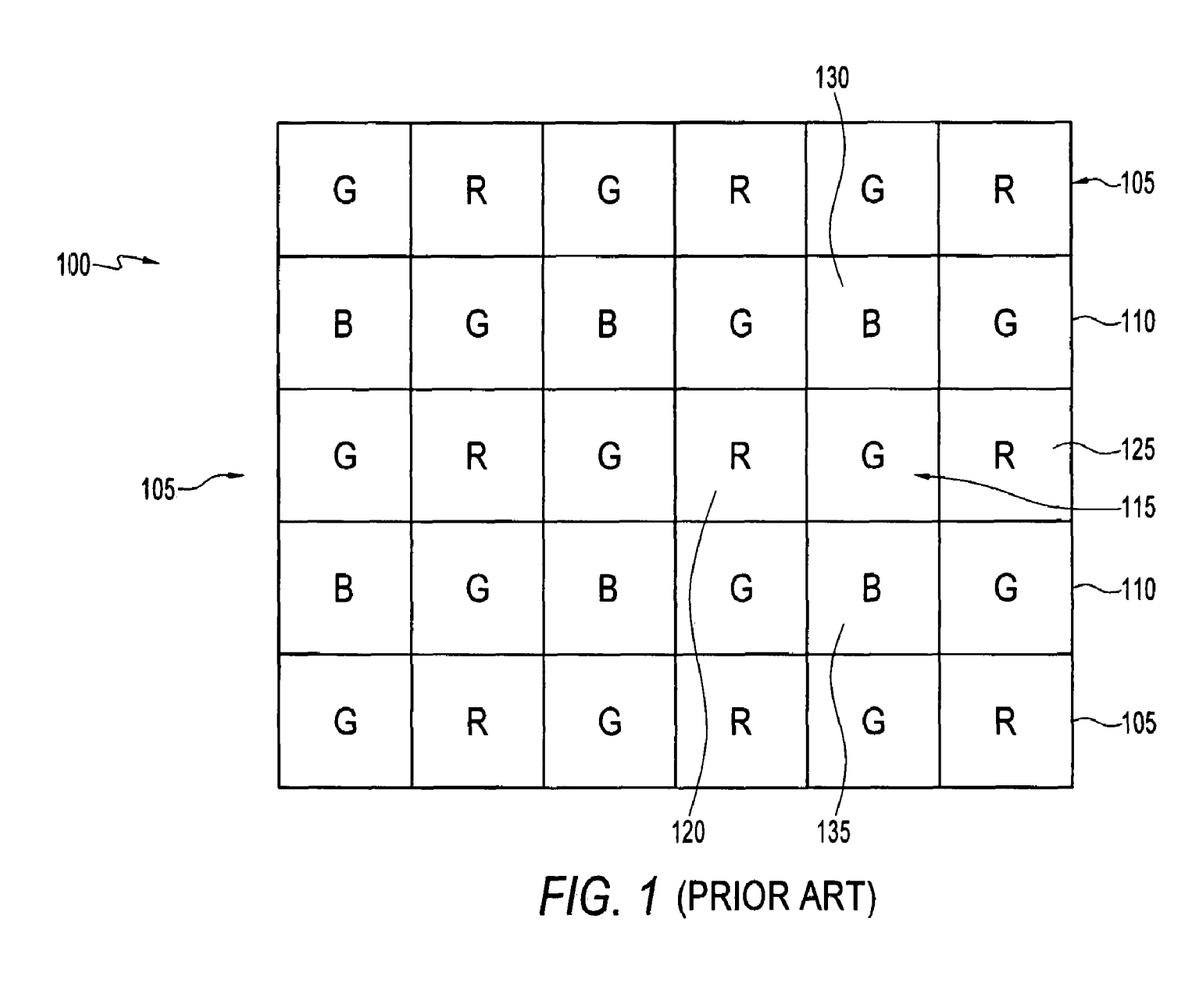
FIG. 1 is a top-down illustration of a conventional color filter array.

As shown in FIG. 1, the Bayer pattern 100 is an array of repeating red (R), green (G), and blue (B) filters. In the Bayer pattern 100, red, green and blue pixels are arranged so that alternating red and green pixels are on a first row 105 of an array, and alternating blue and green pixels are on a next row 110. These alternating rows are repeated throughout the array. Thus, when the image sensor is read out, line by line, the pixel sequence for the first line reads GRGRGR etc., and then the alternate line sequence reads BGBGBG etc. This output is called sequential RGB or sRGB.

In the Bayer pattern 100, sampling rates for all three basic colors are adjusted according to the acuity of the human visual system. That is, green color, to which the human eye is most sensitive and responsive, is sensed with a larger number of sensors, whereas blue and red color, for which the human vision has less resolution, are sensed with a fewer number of sensors. This is why in the Bayer pattern, the green-sensitive elements occur at every other array position, while the red-sensitive elements and the blue-sensitive elements occur at every fourth array position.

Figure 2:
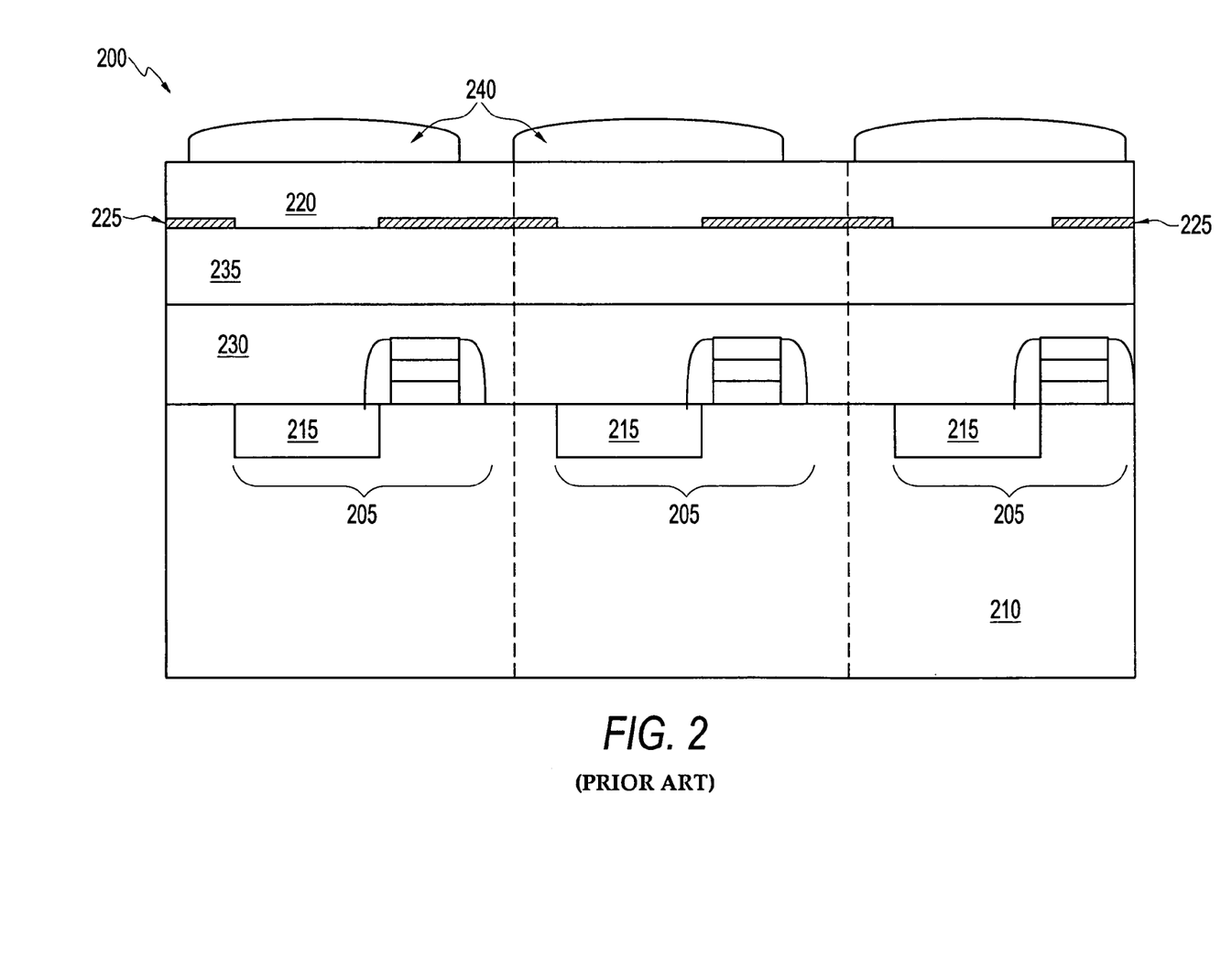
FIG. 2 is a cross-sectional view of a portion of a pixel array having a color filter array.

As shown in FIG. 2 in a solid state image sensor, the Bayer patterned filters may be formed over an array 200 of pixel sensor cells 205. Specifically, an array 200 of pixel sensor cells 205 is formed on a semiconductor substrate 210. Each pixel sensor cell 205 has a photosensitive element 215, which may be any photon-to-charge converting device, such as a photogate, photoconductor or photodiode. The color filter array 220 is typically formed over a metal layer 225 in the array 200, separated from the photosensors 215 by various metallization and insulating layers such as an interlevel dielectric layer (ILD) 235 containing insulator metallization patterns and a passivation layer 230. The metal layer 225 may be opaque and used to shield the areas of the pixels that are not light sensitive. Convex lenses 240 are formed over the color filters 220. In operation, incident light is focused by the lenses 240 through the filters 220 to the photosensitive element 215.

For a Bayer pattern filter, values for red, green and blue are necessary for each pixel. Since each pixel sensor cell is only sensing one color, values for the remaining two colors are calculated by interpolation from the neighboring pixel cells that are sensing the missing colors. This color plane interpolation is known as demosaicing. For example, with reference to FIG. 1, pixel sensor cell 115 is associated with a green filter, which causes pixel sensor cell 115 to sense green light and produce a signal which represents only green light. In order to obtain an approximation of the amount of red and blue light for pixel sensor cell 115, a value may be interpolated from the neighboring red pixel sensor cells 120 and 125 and the neighboring blue pixel sensor cells 130 and 135, respectively. If demosaicing is not performed correctly, the resulting image may suffer from the inclusion of highly visible color artifacts.

The article entitled "Color Plane Interpolation Using Alternating Projections" published in the IEEE Transactions on Image Processing, Vol. II, No. 9 in September 2002 and written by Bahadir K. Gunturk, Yucel Altunbasak and Russell M. Mersereau (the disclosure of which is incorporated by reference herein) compares several demosaicing techniques. As described each of these demosaicing techniques have their respective advantages and disadvantages.

As described, for each pixel sensor cell, the value used for a first color is based on a sensed color and the values for the remaining two colors are based on an interpolated value from the sensed values of corresponding neighboring pixels. Each of the sensed values are representative of the color value at the center of the pixel. Each of the interpolated color values are also representative of the value at the center of the pixel. The interpolated signal is inherently of a lower quality than the originally sensed signal. For example, a interpolated red color value at the center of a pixel would be different than a sensed red color value for the center of the same pixel. These differences in quality may be amplified by the sharpening stage commonly incorporated in digital camera systems or other post capture image adjustment programs. Therefore the mixture of sensed color values and interpolated color values causes in-consistent quality across the picture. A few specific examples of the artifacts are described in the following paragraph.

Demosaicing methods which only reconstruct the missing color components may result in artifacts such as so-called zipper effects and random color dots. Zipper effects may be caused by variations in interpolation and may result in a line of dots along horizontal or vertical lines in regular intervals, for example, one dot every two pixels. This may result from the variations in the separate interpolations of the red and blue values causing the zipper effect in the final image. Random color dots appear mostly along edges within the image and at the end points of lines when lighter area gets light dots and darker area gets dark dots. This effect is most likely caused by efforts during interpolation to produce sharp edges, and the use of other nearby pixels in determining color values. In addition to zipper effects and random color dots, additional unbalance problems result when the two green samples in a particular Bayer mosaic (the elementary 4 cell square) are digitized by different pixel processing channels.

Accordingly, there is a desire and need for color plane interpolation that mitigates the disadvantages of known demosaicing techniques.

BRIEF SUMMARY OF THE INVENTION

A method and apparatus for color plane interpolation are provided which selects a color-interpolation point within a pixel image for surface color plane interpolation for each color present in a color pattern. Once the color-interpolation point is selected a value for each color in the color pattern is interpolated for each of the color-interpolation points. The use of the color-interpolation points and the interpolation of each of the colors present in the color pattern helps to reduce or eliminate some of the disadvantages of known demosaicing techniques.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention.

The term "substrate" is to be understood as a semiconductor-based material including silicon, silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "substrate" in the following description, previous process steps may have been utilized to form regions or junctions in or over the base semiconductor structure or foundation. In addition, the semiconductor need not be silicon-based, but could be based on silicon-germanium, germanium, or gallium arsenide.

The term "pixel" refers to a picture element unit cell containing a photosensor and transistors for converting light radiation to an electrical signal. For purposes of illustration, a representative pixel is illustrated in the figures and description herein and, typically, fabrication of all pixels in an imager will proceed simultaneously in a similar fashion. The following detailed description is, therefore, not to be taken in a limiting sense, and the the present invention is defined by the appended claims.

It should be understood that reference to a CMOS imager in accordance with the present invention is made for the sole purpose of describing just one example of the present invention. It should be readily apparent that the present invention is not limited to CMOS imagers, but also applies to CCD and other imagers that employ color filters over pixels. Additionally, the current invention is described using a standard three color Bayer pattern. It should be understood that the present invention is not limited to the standard three color Bayer pattern but may be applied to color spaces which use different colors or which use more, or less, than three colors.

Figure 3:
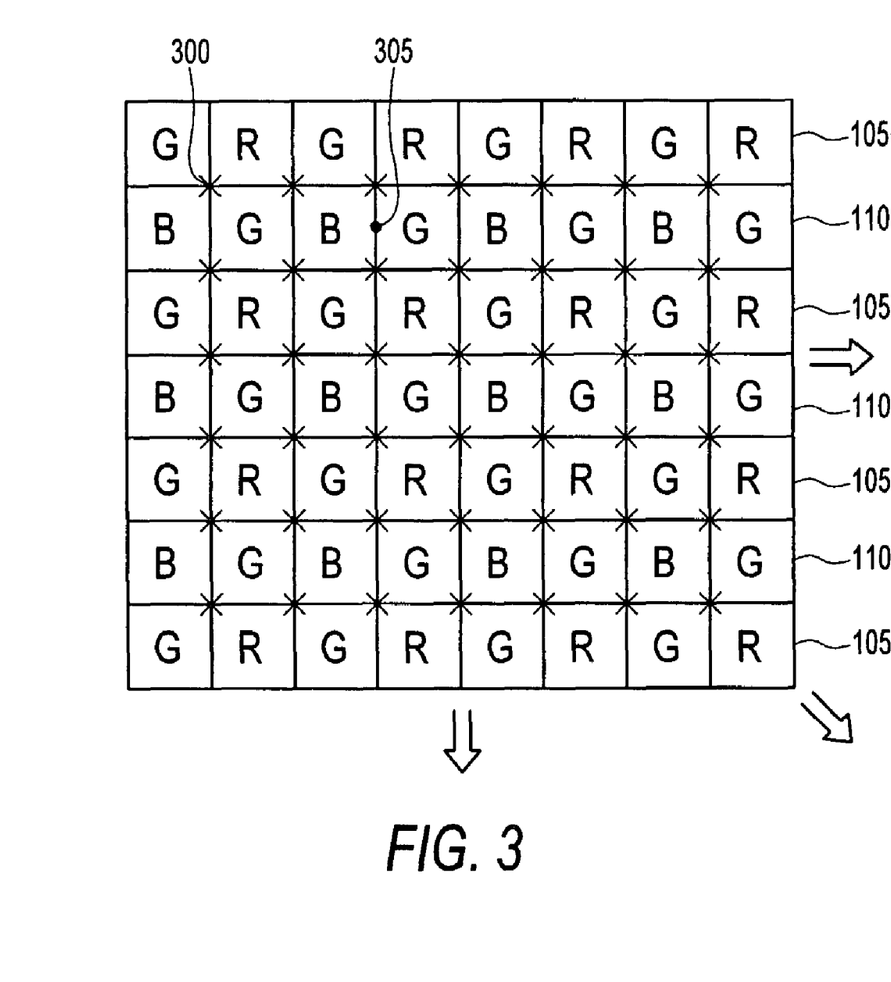
FIG. 3 is a top-down illustration of the three-color-interpolation points in accordance with a first embodiment of the present invention.

FIG. 3 is a top-down illustration of the three-color-interpolation points in accordance with a first embodiment of the present invention. The three-color-interpolation points are identified by x's in FIG. 3. A representative "x" is labeled 300. Each pixel sensor cell provides a sensed value for its respective filtered color. Each green (G) pixel sensor cell provides a sensed value for green. Similarly, each blue (B) pixel sensor cell provides a sensed value for blue and each red (R) pixel sensor cell provides a sensed value for red. For each of the three-color interpolation points x, a number of sensed pixel signal values are used to interpolate a value for the point. Once these interpolated values are calculated, the interpolated values are used to reconstruct the color image. Calculating values for green, red and blue, at each of the three-color-interpolation points x results in a phase shifting of the values from the center of each of the pixel sensor cells to the corners, in this embodiment, of the pixel sensor cells. Interpolation of each of the values for red, green and blue eliminates the imbalance resulting from the use of sensed values for one of the colors and interpolated values of the remaining two colors prevalent in prior art systems. One of ordinary skill in the art would appreciate that three-color-interpolation points need not necessarily be located at the corners of pixels, and may instead be located at different points. For example, by the appropriate selection of the pixels to be included in the interpolation, and the appropriate selection of coefficients, the three-color-interpolation point may be located along the border of two pixels, halfway between the top and bottom borders of the pixels as indicated at 305, or at other locations which do not correspond to the pixel centers.

Figure 4:
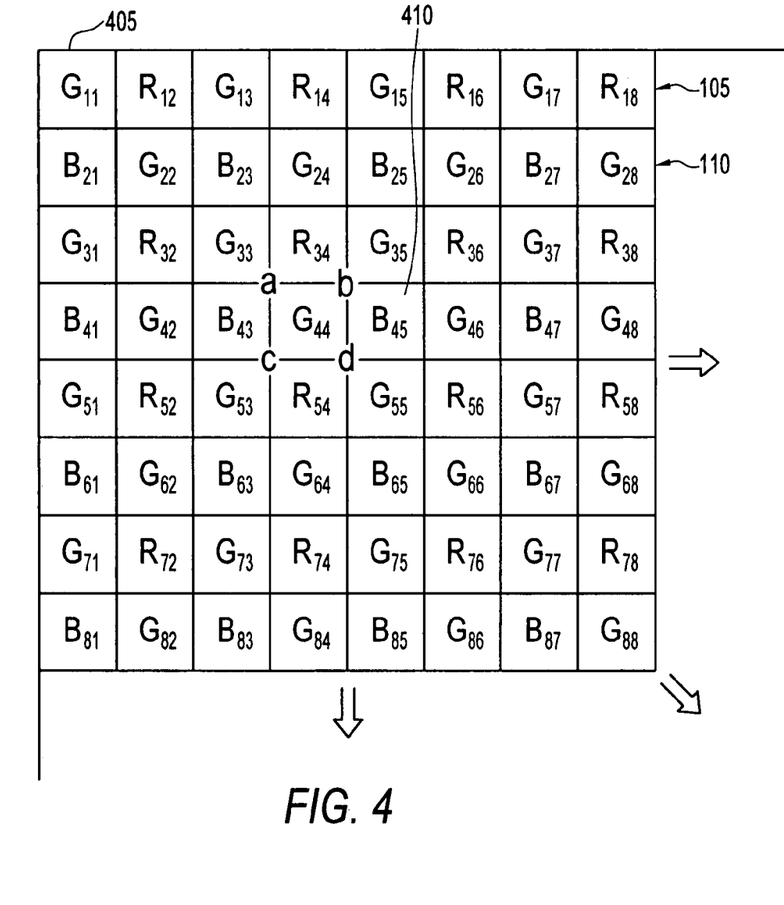
FIG. 4 is a top-down illustration of the three-color-interpolation points for points "a," "b," "c," and "d" in accordance with the present invention.

FIG. 4 is a top-down illustration of the three-color-interpolation points for points "a," "b," "c," and "d" in accordance with one embodiment of the present invention. In FIG. 4, each pixel sensor cell is denoted by its color (G, R or B) and the notation $_{xy}$, where x represents the row and y represents the column of where the pixel sensor cell resides in the array. For example, pixel sensor cell 405 is denoted $G_{11}$. Where $G_{11}$ identifies pixel sensor cell 405 to be associated with a green filter and located in row 1 and column 1. Similarly, pixel sensor cell 410 is denoted $B_{45}$ indicating that the pixel sensor cell is associated with a blue filter and located in row 4 and column 5.

For each three-color-interpolation point, a, b, c and d the green color value, the red color value and the blue color value can be interpolated as follows:

Interpolated Values for Three-Color-Interpolation Point "a"

In an exemplary embodiment, interpolation for the green value for point "a" of FIG. 4 is calculated using the sensed values for green for pixel sensor cells $G_{24}$, $G_{33}$, $G_{35}$, $G_{42}$, $G_{44}$, and $G_{53}$. The interpolated value for green at three-color-interpolation point "a" can be calculated using the following equations:

Temp1=$G_{33}$*coef_g3+$G_{53}$*coef_g1;

Temp2=$G_{44}$*coef_g3+$G_{24}$*coef_g1;

Temp3=$G_{33}$*coef_g3+$G_{35}$*coef_g1;

Temp4=$G_{44}$*coef_g3+$G_{42}$*coef_g1; and

Ga=(Temp1+Temp2+Temp3+Temp4)/4, where the coefficients "coef_g3" and "coef_g1" constitute a quarter-pel phase shift filter and "coef_g3" and "coef_g1" sum to one. In an exemplary embodiment coef_g1=928/1024 and coef_g3=1-(928/1024) or coef_g3=96/1024. One of ordinary skill in the art would appreciate that other filter coefficients are within the scope of the invention. Temp1-Temp4 are interim values used in the calculation of the green value at point "a," and may be eliminated by replacing the Temp values by their respective equations in the Ga equation.

In an exemplary embodiment, interpolation for the red value for point "a" of FIG. 4 is calculated using the sensed values for red for pixel sensor cells $R_{32}$, $R_{34}$, $R_{52}$, $R_{54}$, and the sensed values for green for the pixel sensor cells $G_{22}$, $G_{24}$, $G_{31}$, $G_{33}$, $G_{35}$, $G_{42}$, $G_{44}$, $G_{51}$, $G_{53}$, $G_{55}$, $G_{62}$, and $G_{64}$. The interpolated value for red at three-color-interpolation point "a" can be calculated using the following equations:

Temp1=$R_{34}$-($G_{33}$+$G_{35}$+$G_{24}$+$G_{44}$)/4;

Temp2=$R_{54}$-($G_{53}$+$G_{55}$+$G_{44}$+$G_{64}$)/4;

Temp3=$R_{32}$-($G_{31}$+$G_{33}$+$G_{22}$+$G_{42}$)/4;

Temp4=$R_{52}$-($G_{51}$+$G_{53}$+$G_{42}$+$G_{62}$)/4;

Temp5=Temp1*coef_r3+Temp2*coef_r1;

Temp6=Temp3*coef_r3+Temp4*coef_r1;

Temp7=Temp5*coef_r3+Temp6*coef_r1; and

Ra=Temp7+Ga, where the filter coefficients "coef_r3" and "coef_r1" constitute a quarter-pel phase shift filter and "coef_r3" and "coef_r1" sum to one. In an exemplary embodiment coef_r1=768/1024 and coef_r3=1-(768/1024) or coef_r3=256/1024. One of ordinary skill in the art would appreciate that other filter coefficients are within the scope of the invention. Temp1-Temp7 are interim values used in the calculation of the red value at point "a," and may be eliminated by replacing the Temp values by their respective equations in the Ra equation.

In an exemplary embodiment, interpolation for the blue value for point "a" of FIG. 4 is calculated using the sensed values for blue for the pixel sensor cells $B_{23}$, $B_{25}$, $B_{43}$, $B_{45}$ and the sensed values for green for pixel sensor cells $G_{13}$, $G_{15}$, $G_{22}$, $G_{24}$, $G_{26}$, $G_{33}$, $G_{35}$, $G_{42}$, $G_{44}$, $G_{46}$, $G_{53}$, and $G_{55}$. The interpolated value for blue at three-color-interpolation point "a" can be calculated using the following equations:

Temp1=$B_{43}$-($G_{42}$+$G_{44}$+$G_{33}$+$G_{53}$)/4;

Temp2=$B_{23}$-($G_{22}$+$G_{24}$+$G_{13}$+$G_{33}$)/4;

Temp3=$B_{45}$-($G_{44}$+$G_{46}$+$G_{35}$+$G_{55}$)/4;

Temp4=$B_{25}$-($G_{24}$+$G_{26}$+$G_{15}$+$G_{35}$)/4;

Temp5=Temp1*coef_b3+Temp2*coef_b1;

Temp6=Temp3*coef_b3+Temp4*coef_b1;

Temp7=Temp5*coef_b3+Temp6*coef_b1; and

Ba=Temp7+Ga, where the filter coefficients "coef_b3" and "coef_b1" constitute a quarter-pel phase shift filter and "coef_b3" and "coef_b1" sum to one. In an exemplary embodiment coef_b1=768/1024 and coef_b3=1-(768/1024) or coef_b3=256/1024. One of ordinary skill in the art would appreciate that other filter coefficients are within the scope of the invention. Temp1-Temp7 are interim values used in the calculation of the blue value at point "a," and may be eliminated by replacing the Temp values by their respective equations in the Ba equation.

Interpolated Values for Three-Color-Interpolation Point "b"

In an exemplary embodiment, interpolation for the green value for point "b" of FIG. 4 is calculated using the sensed values for green for pixel sensor cells $G_{24}$, $G_{33}$, $G_{35}$, $G_{44}$, $G_{46}$, and $G_{55}$. The interpolated value for green at three-color-interpolation point "b" can be calculated using the following equations:

Temp1=$G_{44}$*coef_g3+$G_{24}$*coef_g1;

Temp2=$G_{35}$*coef_g3+$G_{55}$*coef_g1;

Temp3=$G_{44}$*coef_g3+$G_{46}$*coef_g1;

Temp4=$G_{35}$*coef_g3+$G_{33}$*coef_g1; and

Gb=(Temp1+Temp2+Temp3+Temp4)/4,

Where the filter coefficients "coef_g3" and "coef_g1" constitute a quarter-pel phase shift filter and "coef_g3" and "coef_g1" sum to one. In an exemplary embodiment coef_g1=928/1024 and coef_g3=1-(928/1024) or coef_g3=96/1024. One of ordinary skill in the art would appreciate that other filter coefficients are within the scope of the invention. Temp1-Temp4 are interim values used in the calculation of the green value at point "b," and may be eliminated by replacing the Temp values by their respective equations in the Gb equation.

In an exemplary embodiment, interpolation for the red value for point "b" of FIG. 4 is calculated using the sensed values for red for the pixel sensor cells $R_{34}$, $R_{36}$, $R_{54}$, $R_{56}$, and the sensed values for green for pixel sensor cells $G_{24}$, $G_{26}$, $G_{33}$, $G_{35}$, $G_{37}$, $G_{44}$, $G_{46}$, $G_{55}$, $G_{57}$, $G_{64}$, and $G_{66}$. The interpolated value for red at three-color-interpolation point "b" can be calculated using the following equations:

Temp1=$R_{34}$-($G_{33}$+$G_{35}$+$G_{24}$+$G_{44}$)/4;

Temp2=$R_{54}$-($G_{53}$+$G_{55}$+$G_{44}$+$G_{64}$)/4;

$Temp3 = R_{36} - (G_{35} + G_{37} + G_{26} + G_{46})/4;$ $Temp4 = R_{56} - (G_{55} + G_{57} + G_{46} + G_{66})/4;$ $Temp5 = Temp1 * coef\_r3 + Temp2 * coef\_r1;$ $Temp6 = Temp3 * coef\_r3 + Temp4 * coef\_r1;$ $Temp7 = Temp5 * coef\_r3 + Temp6 * coef\_r1;$ and $Rb = Temp7 + Gb,$ where the filter coefficients "coef_r3" and "coef_r1" constitute a quarter-pel phase shift filter and "coef_r3" and "coef_r1" sum to one. In an exemplary embodiment coef_r1=768/1024 and coef_r3=1- (768/1024) or coef_r3=256/1024. One of ordinary skill in the art would appreciate that other filter coefficients are within the scope of the invention. Temp1-Temp7 are interim values used in the calculation of the red value at point "b," and may be eliminated by replacing the Temp values by their respective equations in the Rb equation.

In an exemplary embodiment, interpolation for the blue value for point "b" of FIG. 4 is calculated using the sensed values for blue for the pixel sensor cells $B_{23}, B_{25}, B_{43}, B_{45}$ and the sensed values for green for pixel sensor cells $G_{13}, G_{15}, G_{22}, G_{24}, G_{26}, G_{33}, G_{35}, G_{42}, G_{44}, G_{46}, G_{53},$ and $G_{55}$. The interpolated value for blue at three-color-interpolation point "b" can be calculated using the following equations:

$Temp1 = B_{45} - (G_{44} + G_{46} + G_{35} + G_{55})/4;$ $Temp2 = B_{25} - (G_{24} + G_{26} + G_{15} + G_{35})/4;$ $Temp3 = B_{43} - (G_{42} + G_{44} + G_{33} + G_{53})/4;$ $Temp4 = B_{23} - (G_{22} + G_{24} + G_{13} + G_{33})/4;$ $Temp5 = Temp1 * coef\_b3 + Temp2 * coef\_b1;$ $Temp6 = Temp3 * coef\_b3 + Temp4 * coef\_b1;$ $Temp7 = Temp5 * coef\_b3 + Temp6 * coef\_b1;$ and $Bb = Temp7 + Gb,$ where the filter coefficients "coef_b3" and "coef_b1" constitute a quarter-pel phase shift filter and "coef_b3" and "coef_b1" sum to one. In an exemplary embodiment coef_b1=768/1024 and coef_b3=1-(768/1024) or coef_b3=256/1024. One of ordinary skill in the art would appreciate that other filter coefficients are within the scope of the invention. Temp1-Temp7 are interim values used in the calculation of the blue value at point "b," and may be eliminated by replacing the Temp values by their respective equations in the Bb equation.

Interpolated Values for Three-Color-Interpolation point "c"

In an exemplary embodiment, interpolation for the green value for point "c" of FIG. 4 is calculated using the sensed values for green for pixel sensor cells $G_{33}, G_{42}, G_{44}, G_{53}, G_{55},$ and $G_{64}$. The interpolated value for green at three-color-interpolation point "c" can be calculated using the following equations:

$Temp1 = G_{53} * coef\_g3 + G_{33} * coef\_g1;$ $Temp2 = G_{44} * coef\_g3 + G_{54} * coef\_g1;$ $Temp3 = G_{53} * coef\_g3 + G_{55} * coef\_g1;$ $Temp4 = G_{44} * coef\_g3 + G_{42} * coef\_g1;$ and $G = (Temp1 + Temp2 + Temp3 + Temp4)/4,$ Where the filter coefficients "coef_g3" and "coef_1" constitute a quarter-pel phase shift filter and "coef_g3" and "coef_g1" sum to one. In an exemplary embodiment coef_g1=928/1024 and coef_g3=1-(928/1024) or coef_g3=96/1024. One of ordinary skill in the art would appreciate that other filter coefficients are within the scope of the invention. Temp1-Temp4 are interim values used in the calculation of the green value at point "c," and may be eliminated by replacing the Temp values by their respective equations in the Gc equation.

In an exemplary embodiment, interpolation for the red value for point "c" of FIG. 4 is calculated using the sensed values for red for the pixel sensor cells $R_{32}, R_{34}, R_{52}, R_{54},$ and the sensed values for green for pixel sensor cells $G_{22}, G_{24}, G_{31}, G_{33}, G_{35}, G_{42}, G_{44}, G_{51}, G_{53}, G_{55}, G_{62},$ and $G_{64}$. The interpolated value for red at three-color-interpolation point "c" can be calculated using the following equations:

$Temp1 = R_{54} - (G_{53} + G_{55} + G_{44} + G_{64})/4;$ $Temp2 = R_{34} - (G_{33} + G_{35} + G_{24} + G_{44})/4;$ $Temp3 = R_{52} - (G_{51} + G_{53} + G_{42} + G_{62})/4;$ $Temp4 = R_{32} - (G_{31} + G_{33} + G_{22} + G_{42})/4;$ $Temp5 = Temp1 * coef\_r3 + Temp2 * coef\_r1;$ $Temp6 = Temp3 * coef\_r3 + Temp4 * coef\_r1;$ $Temp7 = Temp5 * coef\_r3 + Temp6 * coef\_r1;$ and $Rc = Temp7 + Gc,$ where the filter coefficients "coef_r3" and "coef_r1" constitute a quarter-pel phase shift filter and "coef_r3" and "coef_r1" sum to one. In an exemplary embodiment coef_r=768/1024 and coef_r3=1-(768/1024) or coef_r3 =256/1024. One of ordinary skill in the art would appreciate that other filter coefficients are within the scope of the invention. Temp1-Temp7 are interim values used in the calculation of the red value at point "c," and may be eliminated by replacing the Temp values by their respective equations in the Rc equation.

In an exemplary embodiment, interpolation for the blue value for point "c" of FIG. 4 is calculated using the sensed values for blue for the pixel sensor cells $B_{43}, B_{45}, B_{63}, B_{65}$ and the sensed values for green for pixel sensor cells $G_{33}, G_{35}, G_{42}, G_{44}, G_{46}, G_{53}, G_{55}, G_{62}, G_{64}, G_{66}, G_{73},$ and $G_{75}$. The interpolated value for blue at three-color-interpolation point "c" can be calculated using the following equations:

$Temp1 = B_{43} - (G_{42} + G_{44} + G_{33} + G_{53})/4;$ $Temp2 = B_{63} - (G_{62} + G_{64} + G_{53} + G_{73})/4;$ $Temp3 = B_{45} - (G_{44} + G_{46} + G_{35} + G_{55})/4;$ $Temp4 = B_{65} - (G_{64} + G_{66} + G_{55} + G_{75})/4;$ $Temp5 = Temp1 * coef\_b3 + Temp2 * coef\_b1;$ $Temp6 = Temp3 * coef\_b3 + Temp4 * coef\_b1;$ $Temp7 = Temp5 * coef\_b3 + Temp6 * coef\_b1;$ and $Bc = Temp7 + G_c,$ where the filter coefficients "coef_b3" and "coef_b1" constitute a quarter-pel phase shift filter and "coef_b3" and "coef_b1" sum to one. In an exemplary embodiment coef_b1=768/1024 and coef_b3=1-(768/1024) or coef_b3=256/1024. One of ordinary skill in the art would appreciate that other filter coefficients are within the scope of the invention. Temp1-Temp7 are interim values used in the calculation of the blue value at point "c," and may be eliminated by replacing the Temp values by their respective equations in the $B_c$ equation.

Interpolated Values for Three-Color-Interpolation point "d"

In an exemplary embodiment, interpolation for the green value for point "d" of FIG. 4 is calculated using the sensed values for green for pixel sensor cells $G_{35}$, $G_{44}$, $G_{46}$, $G_{53}$, $G_{55}$, and $G_{64}$. The interpolated value for green at three-color-interpolation point "d" can be calculated using the following equations:

$Temp1 = G_{44}*coef\_g3 + G_{64}*coef\_g1;$ $Temp2 = G_{55}*coef\_g3 + G_{53}*coef\_g1;$ $Temp3 = G_{44}*coef\_g3 + G_{46}*coef\_g1;$ $Temp4 = G_{55}*coef\_g3 + G_{35}*coef\_g1;$ and $Gd = (Temp1 + Temp2 + Temp3 + Temp4)/4,$ where the filter coefficients "coef_g3" and "coef_1" constitute a quarter-pel phase shift filter and "coef_g3" and "coef_g1" sum to one. In an exemplary embodiment coef_g1=928/1024 and coef_g3=1-(928/1024) or coef_g3=96/1024. One of ordinary skill in the art would appreciate that other filter coefficients are within the scope of the invention. Temp1-Temp4 are interim values used in the calculation of the green value at point "d," and may be eliminated by replacing the Temp values by their respective equations in the Gd equation.

In an exemplary embodiment, interpolation for the red value for point "d" of FIG. 4 is calculated using the sensed values for red for the pixel sensor cells $R_{34}$, $R_{36}$, $R_{54}$, $R_{56}$, and the sensed values for green for pixel sensor cells $G_{24}$, $G_{26}$, $G_{33}$, $G_{35}$, $G_{37}$, $G_{44}$, $G_{46}$, $G_{53}$, $G_{55}$, $G_{57}$, $G_{64}$, and $G_{66}$. The interpolated value for red at three-color-interpolation point "d" can be calculated using the following equations:

$Temp1 = R_{54} - (G_{53} + G_{55} + G_{44} + G_{64})/4;$ $Temp2 = R_{34} - (G_{33} + G_{35} + G_{24} + G_{44})/4;$ $Temp3 = R_{56} - (G_{55} + G_{57} + G_{46} + G_{66})/4;$ $Temp4 = R_{36} - (G_{35} + G_{37} + G_{26} + G_{46})/4;$ $Temp5 = Temp1*coef\_r3 + Temp2*coef\_{i_r}1;$ $Temp6 = Temp3*coef\_r3 + Temp4*coef\_r1;$ $Temp7 = Temp5*coef\_r3 + Temp6*coef\_r1;$ and $Rd = Temp7 + Gd,$ where the filter coefficients "coef_r3" and "coef_r1" constitute a quarter-pel phase shift filter and "coef_r3" and "coef_r1" sum to one. In an exemplary embodiment coef_r1=768/1024 and coef_r3=1-(768/1024) or coef_r3=256/1024. One of ordinary skill in the art would appreciate that other filter coefficients are within the scope of the invention. Temp1-Temp7 are interim values used in the calculation of the red value at point "d," and may be eliminated by replacing the Temp values by their respective equations in the Rd equation.

In an exemplary embodiment, interpolation for the blue value for point "d" of FIG. 4 is calculated using the sensed values for blue for the pixel sensor cells $B_{43}$, $B_{45}$, $B_{63}$, $B_{65}$ and the sensed values for green for pixel sensor cells $G_{33}$, $G_{35}$, $G_{42}$, $G_{44}$, $G_{46}$, $G_{53}$, $G_{55}$, $G_{62}$, $G_{64}$, $G_{66}$, $G_{73}$, and $G_{75}$. The interpolated value for blue at three-color-interpolation point "d" can be calculated using the following equations:

$Temp1 = B_{45} - (G_{44} + G_{46} + G_{35} + G_{53})/4;$ $Temp2 = B_{65} - (G_{64} + G_{66} + G_{55} + G_{75})/4;$ $Temp3 = B_{43} - (G_{42} + G_{44} + G_{33} + G_{53})/4;$ $Temp4 = B_{63} - (G_{62} + G_{64} + G_{53} + G_{73})/4;$ $Temp5 = Temp1*coef\_b3 + Temp2*coef\_b1;$ $Temp6 = Temp3*coef\_b3 + Temp4*coef\_b1;$ $Temp7 = Temp5*coef\_b3 + Temp6*coef\_b1;$ and $Bd = Temp7 + Gd,$ where the filter coefficients "coef_b3" and "coef_b1" constitute a quarter-pel phase shift filter and "coef_b3" and "coef_b1" sum to one. In an exemplary embodiment coef_b1=768/1024 and coef_b3=1-(768/1024) or coef_b3=256/1024. One of ordinary skill in the art would appreciate that other filter coefficients are within the scope of the invention. Temp1-Temp7 are interim values used in the calculation of the blue value at point "d," and may be eliminated by replacing the Temp values by their respective equations in the Bd equation.

As demonstrated by the equations given for points a, b, c and d, above, in the presented embodiment the green interpolated value uses the sensed values for the two pixel cells which sample green (e.g., $G_{33}$, $G_{44}$ for Point a) and help to form part of the three-color-interpolation point, and the sensed values for four additional pixel cells which sample green (e.g., $G_{53}$, $G_{24}$, $G_{35}$, and $G_{42}$ for Point a) and are a single pixel away from the three-color-interpolation point. The six pixels used to determine the interpolated green value are referred to as corresponding or neighboring pixel cells. Additionally, as shown in the Green interpolation equations, in the exemplary embodiment, greater weight is placed on the sensed green values of the two pixel cells (e.g., $G_{33}$, $G_{44}$ for Point a) which help to form the three-color-interpolation point as compared to the additional four pixel cells (e.g., $G_{53}$, $G_{24}$, $G_{35}$, and $G_{42}$ for Point a) used in the interpolation. As shown by the equations, each of the green color values for $G_{33}$ and $G_{44}$ appear twice in the corresponding equations and the filter coefficients are also used to ensure the sensed green values are weighted correctly. For example, in the interpolation for the green value for point a, the sensed values at pixel cells $G_{33}$ and $G_{44}$ are weighted more heavily, through the use of coef_g3 than the sensed values at pixel cells $G_{53}$, $G_{24}$, $G_{35}$ and $G_{42}$ which use the filter coefficient coef_g1.

Also, as demonstrated by the equations given for points a, b, c and d, above, in the exemplary embodiment the red interpolated value uses the sensed values for the four closest pixel cells (e.g., $R_{34}$, $R_{54}$, $R_{32}$, and $R_{52}$ for Point a) which sample red. Each of these red sensed pixels are one pixel width or closer to the three-color interpolation point. Additionally, for each of the red sensed pixels, the four green sensed pixels (e.g., $G_{33}$, $G_{35}$, $G_{24}$, and $G_{44}$) which surround the red sample pixel (Pixel $R_{34}$ in the interpolation for Point a) are used to interpolate the interpolated red value. For example, in the interpolation of the red value for point a, the sensed red values at $R_{34}$, $R_{54}$, $R_{32}$ and $R_{52}$ are used. In addition for $R_{34}$ the sensed green values for its four green neighbor pixel cells, $G_{33}$, $G_{35}$, $G_{24}$ and $G_{44}$ are used in the interpolation. Similarly, in addition to the sensed red value for $R_{54}$ the sensed green values for its four green neighboring pixel cells, $G_{53}$, $G_{55}$, $G_{44}$ and $G_{64}$ are used in the interpolation for the red value at point a. The blue interpolated values for the three-color-interpolation points are calculated Similarly to the red values except that the four closest pixels which sample blue values are used and the sensed green values for each of those pixels four green neighboring pixel cells are used.

As described, the invention provides a new and novel system and method for color plane interpolation, in which interpolated values for green, red and blue are calculated based on the sensed values obtained. In this invention, the imbalance between sensed values and interpolated values is removed by interpolating the values for each of the colors for the three-color-interpolation point. One of ordinary skill in the art would appreciate that, while the invention describes the location of the three-color-interpolation point being at the corner of two green, one blue and one red pixel, other three-color-interpolation points are possible and within the scope of the invention.

Figure 5:
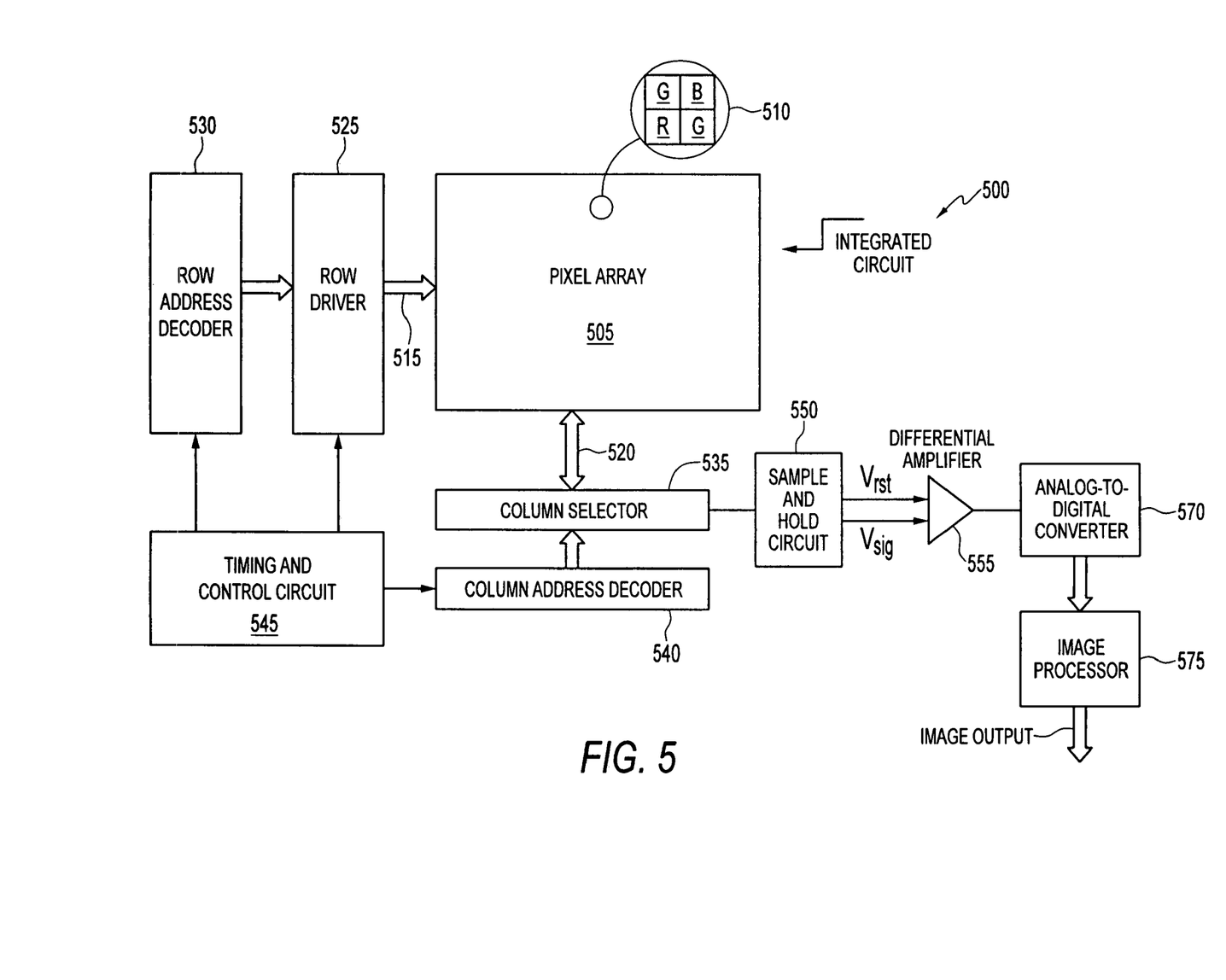
FIG. 5 is a block diagram of a CMOS imager integrated circuit (IC) having a pixel array constructed according to an exemplary embodiment of the invention.

FIG. 5 illustrates a block diagram of a CMOS imager integrated circuit (IC) 500 having a pixel array 505 containing a plurality of pixels arranged in rows and columns, including a region 510 with, for example, two green pixels (G), one blue pixel (B), and one red pixel (R) arranged in a Bayer pattern. The pixels of each row in array 505 are all turned on at the same time by row select lines 515, and the pixels of each column are selectively output by respective column select lines 520.

The row lines 515 are selectively activated by a row driver 525 in response to row address decoder 530. The column select lines 520 are selectively activated by a column selector 535 in response to column address decoder 540. The pixel array 505 is operated by the timing and control circuit 545, which controls address decoders 530, 540 for selecting the appropriate row and column lines for pixel signal readout.

The pixel column signals, which typically include a pixel reset signal ($V_{rst}$) and a pixel image signal ($V_{sig}$), are read by a sample and hold circuit 550 associated with the column selector 535. A differential signal ($V_{rst}$-$V_{sig}$) is produced by differential amplifier 555 for each pixel that is amplified and digitized by analog-to-digital converter 570 (ADC). The analog-to-digital converter 570 supplies the digitized pixel signals to an image processor 575 where the inventive method occurs.

Figure 6:
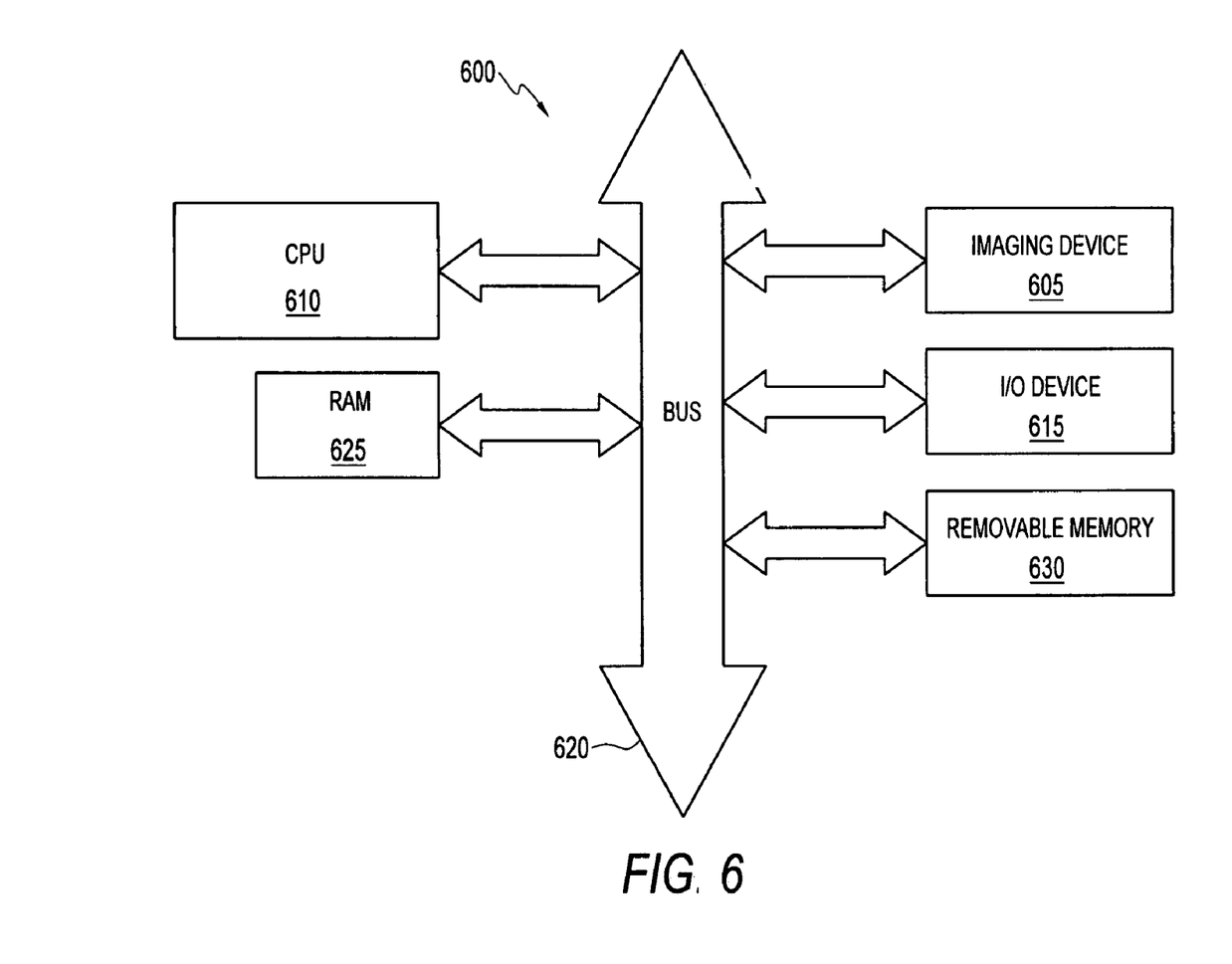
FIG. 6 is an illustration of a processor system having a CMOS imager according to the present invention.

A typical processor system which includes an imager device 605 having a pixel array in which the pixels signals are interpolated according to the present invention is illustrated generally at 600 in FIG. 6. The imager device 605 produces an output image from signals supplied from the pixel array. A processor based system is exemplary of a system receiving the output of a CMOS imager device. Without being limiting, such a system could include a computer system, camera system, scanner, machine vision system, medical sensor system (such as medical pill sensors), and automotive diagnostic system, and other imaging systems, all of which can utilize the present invention.

A processor based system 600, such as a computer system, for example generally comprises a central processing unit (CPU) 610, for example, a microprocessor, that communicates with an input/output (I/O) device 615 over a bus 620. The imager device 605 also communicates with the system over bus 620 or other communication link. The computer system 600 also includes random access memory (RAM) 625, and, in the case of a computer system may include peripheral devices such as a floppy disk drive including removable memory 630 and or compact disk (CD) ROM drive with removable memory 630 which also communicate with CPU 610 over the bus 620. It may also be desirable to integrate the processor 610, imager device 605 and memory 625 on a single IC chip.

Figure 7:
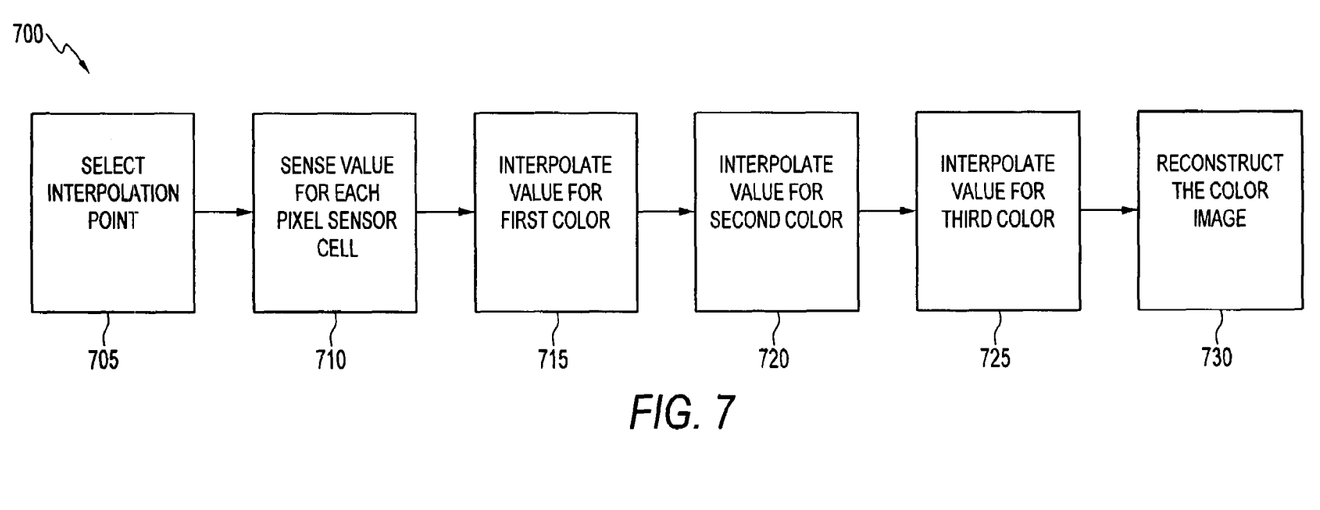
FIG. 7 is a flow chart illustrating the process of one embodiment of the present invention.

FIG. 7 shows a flow chart to illustrate the process 700 of one embodiment of the present invention. In step 705 an interpolation point is selected. In an exemplary embodiment of the invention the interpolation point is located at the intersection of four pixel cells. In step 710 a sensed valued is received for each pixel sensor cell. In steps 715, 720 and 725 the interpolated values for the first color, the second color and the third color, respectively, are determined in accordance with the equations detailed above. Specifically, the equations for interpolating a value for green ate applied in step 715, the equations for interpolating a value for red are applied in step 720 and the equations for interpolating a value for blue are applied in step 725. In step 730 the color image is reconstructed using the interpolated values determined in steps 715, 720 and 725.

It should be understood that other methods of interpolating the values for the green, red and blue colors at one or more three-color-interpolation points are within the scope of the invention, and the invention is in not limited to the equations or use of the coefficients described above. As such, the above description and drawings are only to be considered illustrative of an exemplary embodiment which achieves the features and advantages of the invention. Any modification of the present invention which comes within the spirit and scope of the following claims should be considered part of the invention. Accordingly, the invention is not to be considered as being limited by the foregoing description and drawings, but is only limited by the scope of the appended claims.

What is claimed as new and desired to be protected by Letters Patent of the United States is:

1. A method of color plane interpolation of an image comprising the steps of:
   receiving sensed values of an image from a plurality of pixel sensor cells of a pixel array;
   selecting a plurality of three-color color-interpolation points for color plane interpolation, wherein each of said color-interpolation points corresponds to a location on said image which is offset from a center point of an image pixel;
   interpolating a value for each of a plurality of colors of a color pattern at each interpolation point using received sensed values of said image, including:
      interpolating a value for a first color at said three-color-interpolation point, interpolating a value for a second color at said three-color interpolation point, and
      interpolating a value for a third color at said three-color interpolation point;
   wherein said interpolation for said first color value uses a sensed value for said first color from two pixels adjoining said three-color-interpolation point and a sensed value for said first color from four additional pixels no more than one pixel width from said three-color interpolation point.

2. The method of claim 1 wherein said interpolation for said second color value uses four sensed values for said second color from pixels no more than one pixel width from said three-color-interpolation point and the sensed values for each of the four first color pixels which neighbor each of the second color pixels.

3. The method of claim 2 wherein said interpolation for said third color value uses four sensed values for said third color from pixels no more than one pixel width from said three-color-interpolation point and the sensed values for each of the four first color pixels which neighbor each of the third color pixels.

4. A processing system comprising:
an imaging device including an array of image pixel sensors comprising:
a first plurality of a image pixel sensors that are used to produce sensed values of a first color;
a second plurality of a image pixel sensors that are used to produce sensed values of a second color;
a third plurality of image pixel sensors that are used to produce a sensed value of a third color, and
a processor for performing interpolation using said sensed values of the first color, said sensed values of the second color and said sensed values of the third color to determine an interpolated value of said first color, said second color and said third color for a three-color-interpolation point and where said interpolation is performed for a location which is offset form the center of any pixel sensors, wherein said three-color-interpolation point is located at an intersecting corner of four pixel sensor cells within said array and wherein said interpolation for said first color value uses the sensed value for said first color from two pixels adjoining said three-color-interpolation point and the sensed value for said first color from four additional pixels no more than one pixel width from said three-color interpolation point.

5. The processing system of claim 4 wherein said interpolation for said second color value uses four sensed values for said second color from pixels no more than one pixel width from said three-color-interpolation point and the sensed values for each of the four first color pixels which neighbor each of the second color pixels.

6. The processing system of claim 5 wherein said interpolation for said third color value uses four sensed values for said third color from pixels no more than one pixel width from said three-color-interpolation point and the sensed values for each of the four first color pixels which neighbor each of the third color pixels.

7. A method of color plane interpolation of an image comprising the steps of:
selecting a plurality of three-color-interpolation points for color plane interpolation, wherein each of said three-color-interpolation points corresponds to a location on an image and each of said color-interpolation points is offset from a center point of an image pixel;
interpolating a value for each of a plurality of colors of a color pattern at each interpolation point using pixel values of said image,
wherein said interpolation for a first color value uses the sensed value for said first color from two pixels adjoining said three-color-interpolation point and the sensed value for said first color from four additional pixels no more than one pixel width from said three-color interpolation point.

8. The method of claim 7 wherein said interpolation for a second color value uses four sensed values for said second color from pixels no more than one pixel width from said three-color-interpolation point and the sensed values for each of the four first color pixels which neighbor each of the second color pixels.

9. The method of claim 8 wherein said interpolation for a third color value uses four sensed values for said third color from pixels no more than one pixel width from said three-color-interpolation point and the sensed values for each of the four first color pixels which neighbor each of the third color pixels.

10. A processing system comprising:
an imaging device including an array of image pixel sensors comprising:
a first plurality of a image pixel sensors that are used to produce sensed values of a first color;
a second plurality of a image pixel sensors that are used to produce sensed values of a second color;
a third plurality of image pixel sensors that are used to produce a sensed value of a third color, and
a processor for performing interpolation using said sensed values of the first color, said sensed values of the second color and said sensed values of the third color to determine an interpolated value of said first color, said second color and said third color for a three-color-interpolation point where said three-color-interpolation point is located at an intersecting corner of four pixel sensor cells within said array and where said interpolation is performed for a location which is offset from the center of any pixel sensors and wherein said interpolation for said first color value uses the sensed value for said first color from two pixels adjoining said three-color-interpolation point and the sensed value for said first color from four additional pixels no more than one pixel width from said three-color interpolation point.

11. The processing system of claim 10 wherein said interpolation for said second color value uses four sensed values for said second color from pixels no more than one pixel width from said three-color-interpolation point and the sensed values for each of the four first color pixels which neighbor each of the second color pixels.

12. The processing system of claim 11 wherein said interpolation for said third color value uses four sensed values for said third color from pixels no more than one pixel width from said three-color-interpolation point and the sensed values for each of the four first color pixels which neighbor each of the third color pixels.

* * * * *